United States Patent [19]

Leech et al.

[11] 4,170,359

[45] Oct. 9, 1979

[54] GRAMOPHONE EQUIPMENT

[75] Inventors: Leslie A. Leech; Henry J. Riddoch, both of Fife, Scotland

[73] Assignee: Pico Electronics Limited, Fife, Scotland

[21] Appl. No.: 840,342

[22] Filed: Oct. 7, 1977

[30] Foreign Application Priority Data

Oct. 11, 1976 [GB] United Kingdom ............... 42237/76
Jun. 3, 1977 [GB] United Kingdom ............... 23775/77

[51] Int. Cl.² ........................................... G11B 17/08
[52] U.S. Cl. ................................................ 274/10 R
[58] Field of Search ................. 274/10 R, 10 S, 39 R

[56] References Cited

U.S. PATENT DOCUMENTS

| 1,449,252 | 3/1923 | Stout | 274/10 R |
|---|---|---|---|
| 1,841,593 | 1/1932 | Benjamin | 274/10 R |
| 1,875,641 | 9/1932 | Moore | 274/10 R |
| 2,153,864 | 4/1939 | Faust | 274/10 R |
| 2,251,381 | 8/1941 | Wright | 274/10 R |
| 2,685,447 | 8/1954 | Ristau et al. | 274/10 R |
| 3,379,442 | 4/1968 | Tatter et al. | 274/10 R |
| 3,438,636 | 4/1969 | Carlson | 274/10 R |

Primary Examiner—Richard E. Aegerter
Assistant Examiner—John W. Shepperd
Attorney, Agent, or Firm—Gajarsa, Liss & Conroy

[57] ABSTRACT

Gramophone equipment has a record changing mechanism including a screw arrangement which can be operated to lift and lower a record support platform.

21 Claims, 7 Drawing Figures

GRAMOPHONE EQUIPMENT

BACKGROUND OF THE INVENTION

This invention relates to gramophone record changer equipment.

Conventional domestic record changer equipment comprises a turntable having a centre spindle having means for releasable supporting a stack of records spaced above the turntable, these means normally being in the form of a lower and an upper set of displaceable members or fingers, the lower set being retractable to allow the lowermost record of a supported stack to be released whilst the rest of the stack is gripped by the upper set. Whatever means are employed to support records and to control the release, record changer equipment involves dropping of a record from a height onto the turntable often onto a record already on the turntable. For this reason high quality equipment normally omits a record changing mechanism. Moreover there is conventionally no provision in domestic equipment for returning the records to the stack for replay other than by stopping the equipment and manually lifting the records.

SUMMARY OF THE INVENTION

It is an object of the invention to provide improved gramophone record changer equipment.

According to the invention, there is provided gramophone record changer equipment comprising a turntable, means for supporting a stack of records and for releasing records from the stack one by one onto turntable and means for displacing a record axially of the turntable, the moving means comprising a screw arrangement having a record support portion which will move axially relative to the turntable to displace a record when a rotary drive is applied to the screw arrangement.

The screw arrangement can be designed to lift a stack of records from the turntable and back to its position supported above the turntable to enable the stack to be replayed as desired. To reduce the depth of the screw arrangement when in its lowered position, it may comprise telescopic screw-threaded parts.

In one such embodiment, a conventional autochange centre spindle is provided and the record support portion is apertured at its centre so that it can rise sufficiently to cause the stack to engage with the projecting fingers of the spindle.

Additionally or alternatively, the screw arrangement can be designed for lowering a record from the supporting means onto the turntable. When a record is to be lowered, the record support portion is lifted towards the stack, whereafter the autochange mechanism of the spindle is actuated to release the lowermost record onto the record support portion, which is then lowered to carry the record onto the turntable.

In another embodiment, a simplified centre spindle is used. In this case the spindle has its conventional upper set of fingers to hold a stack when the lowermost record is being dropped and a lower set of fingers to support the stack and which are moved radially inwardly to release the lowermost record. However, an internal spindle mechanism is not required for the lower set of fingers, which are biased outwardly. Rather the screw arrangement is dimensioned to actuate the lower set as the record support portion rises up the spindle. For example, the record support portion can have a counterbore having a first relatively large diameter aperture to clear the fingers and a second relatively small lower aperture to engage the lower fingers. When the support portion is raised sufficiently to cause a stack to be raised above the lower fingers, the upper fingers will be operated to hold the whole stack and the support portion will be lowered. Subsequently, the upper fingers will be released to drop the stack onto the lower fingers. When a record is to be released, the upper fingers are operated conventionally to grip all but the lowermost record of the stack and the support portion is lifted towards the stack; a position will be reached at which the inner aperture will push the lower fingers inwardly to release the lowermost record onto the support portion which at this time will be just below the record, as determined by the depth of the first aperture.

All such operations can be controlled using the record track selection system of British Application No. 13084/75 when adapted to provide the appropriate signals to actuate the screw arrangement and the record change mechanism.

The rotary drive can be applied by the turntable motor when of reversible type; the motor rotation in its normal direction can be arranged to lower the record support portion and reverse rotation can be arranged to raise the record support portion.

Preferably, the turntable is driven by a reversible motor in the form of a stepping motor fed with pulses. Using, say, a 24 pole stepping motor, it has been found that not only can speed control be achieved by controlling the pulse repetition rate but, owing to inertia, the smoothness of rotation can be better than that achieved with a conventional a.c. motor. Moreover, the pulse actuation leads to the advantage that the precise position of the motor is known at any moment by keeping a count of the number of pulses supplied. In this way precise control over the position of the screw arrangement can be achieved. Moreover one can achieve precise control over the angular position of the turntable at the moment the tone arm is engaged with a record.

In a record lifting mechanism using a rotary drive applied by the turntable motor, a part of the mechanism is held stationary to render it operable. For this purpose, part of the mechanism may have a gear which can be engaged to hold it stationary. However, during record playing this gear will be allowed to rotate freely. For this purpose it is proposed to hold the gear stationary by means of a further gear and provide that further gear with a portion without teeth which will rest adjacent the gear of the mechanism to allow it to rotate freely. When engagement is required, a member pivoted to the further gear and having gear teeth on it will be activated to move its teeth to a position engaging the gear of the mechanism, thereby coupling the two gears so that they rotate together until the second gear reaches a given position at which it is held by means, such as a pawl, to lock the gear of the mechanism. This releasable gear coupling arrangement can also or alternatively be used to releasably couple the turntable to a mechanism which, when driven by the turntable motor, operates the centre spindle.

A preferred embodiment has a second motor which has the function of controlling vertical and lateral movements of the tone arm of the equipment and also has the function of operating the supporting means and of holding the appropriate part of the screw arrangement stationary when required.

Preferably, the arrangement is designed so that a first amount of rotation of the second motor in a given direction operates the holding action and a second, subsequent, amount of rotation in the same direction actuates the supporting means. Moreover, it is preferred to split the second amount into two parts, the first part operating the supporting means sufficiently to grip all but the bottom record of a supported record stack and the second, subsequent, part releasing that bottom record to allow it to drop onto the record support portion.

For a better understanding of the invention and to show how the same may be carried into effect, reference will now be made, by way of example, to the accompanying drawings, in which:

FIGS. 1 to 4 illustrate an embodiment of gramophone record changer equipment.

Figure 1:
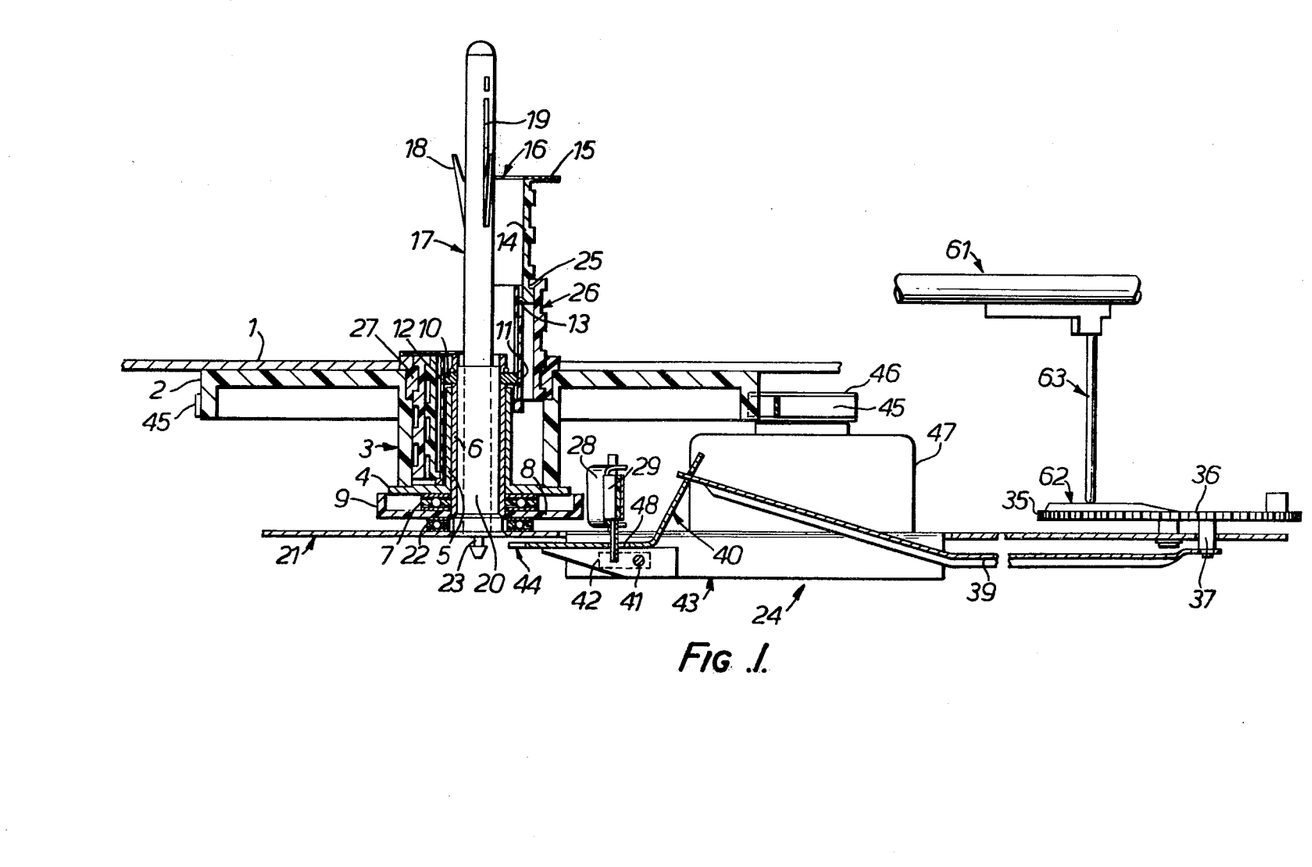
FIG. 1 is a cross-section of a gramophone record changer equipment.

In FIG. 1, the upper surface of a record player turntable is indicated at 1. At its centre is a record lifting and lowering mechanism; at the left-hand side of FIG. 1, the mechanism is shown in a retracted position and at the right in a partially extended position. Secured to the lower surface of the turntable is a plastic pulley 2 having moulded integrally with it at its centre a cylindrical wall 3 having secured to its lower end a metal annular plate 4 formed at its inner periphery with a cylindrical projection 5 in which a metal tube 6 is rotatably mounted on an annular bearing race 7 disposed between plate 4 and an annular lower end plate 8 of the tube 6. The lower end plate 8 of tube 6 is secured to a plastics wheel 9 the circumference of which is serrated. The upper end of tube 6 carries a flange 10 keyed to tube 6 and held in place by a circlip. The flange 10 has a key 11 engaged in a vertical key-way on the internal surface of a sleeve 12. This key-way is closed at its lower end and allows vertical, but not rotary, motion of the sleeve 12 relative to the tube 6.

A second vertical key-way, closed at its upper end, is provided at the outer surface of sleeve 12 and is engaged by a key 13 of a plastics tube 14 the outer surface of which is provided with a coarse screw thread provided with dead-stops at each end. The upper end of tube 14 carries a platform 15 apertured at 16 for the free passages of a conventional autochanger centre spindle 17 with its radially movable lower fingers 18 and upper fingers 19. This spindle passes through a bearing member 20 attached to a base plate 21 which supports wheel 9 by an annular bearing race 22. A control shaft 23 of the spindle extends below base plate 21 so that it can be engaged by a mechanism 24 (FIGS. 1 and 2) to pull the control shaft downwardly to actuate the fingers.

The thread on tube 14 is engaged by a projection 25 formed on the inner surface of the upper end of a second plastics tube 26 formed externally with a coarse screw thread also provided with a dead-stop at each end.

This second thread is engaged by an internally threaded member 27 which is a press fit in and keyed to an annular recess in wall 3.

As shown at the left of FIG. 1, platform 15 can rest substantially level with a turntable mat when placed on the turntable surface, this being the condition of the screw arrangement during record playing when all the parts 2, 5, 6, 12, 14 and 26 shown in FIG. 1 rotate in unison.

To lift a record or records from the turntable, a pivoted brake lever 28 (FIGS. 1 and 2) is operated to engage a rubber pad 29 on the lever 28 with the wheel 9 to hold it against rotation and the turntable is rotated in reverse. This drives the tubes 14 and 26 upwardly, tube 14 normally extending first.

The consequent raising of the platform 15 is sufficient to lift a stack of records past the tips of the lower set of fingers 18, as conventionally provided on an autochange centre spindle to support records above the turntable. Once the records are so positioned, the platform is lowered to the level of the turntable by driving the turntable in its normal direction, after which the brake lever 28 is disengaged to disable the screw arrangement. The turntable can then continue to rotate normally for record playing and records could be caused to drop one by one by actuation of the centre spindle mechanism. However, as will be described, the screw arrangement can also be used to lower records.

The side view of FIG. 1 shows the mechanism 24 for operating the spindle 17 with its lower fingers 18 and upper fingers 19. The operating shaft 23 projects from the lower end of the spindle to be actuated by the mechanism. A given downwards travel of shaft 23 expands fingers 19 to hold all but the lowermost record of a stack and a further downward travel retracts fingers 18 to release the bottom record. The mechanism 24 to operate shaft 23 will now be described with reference to FIGS. 1 and 2, FIG. 2 being an underneath view of the base plate 21. The base plate 21 supports a pulse-operated stepping motor 30 (FIG. 2) which drives by way of a gear 31 and toothed belt 32, a pulley 33 rotatably mounted on base plate 21. Pulley 33 has a gear 34 on its shaft, the gear 34 engaging a toothed flange 35 of a rotatable cam 36. Cam 36 carries a projection 37 which passes through an arcuate slot 38 in the base plate and pivotally connects to an arm 39. Arm 39 is loosely pivotally coupled at its other end to a lever 40 which is loosely and pivotally mounted to the base plate by a shaft 41 engaged in slots 42 in flanges 43 of the base plate. The left-hand end of lever 40 has a slot 44 to engage the shaft 23. Lever 40 contains a slot 48 which receives a projection 49 of the brake lever 28 which is pivoted to the base plate at 50 and is biased by a spring 51.

Figure 2:
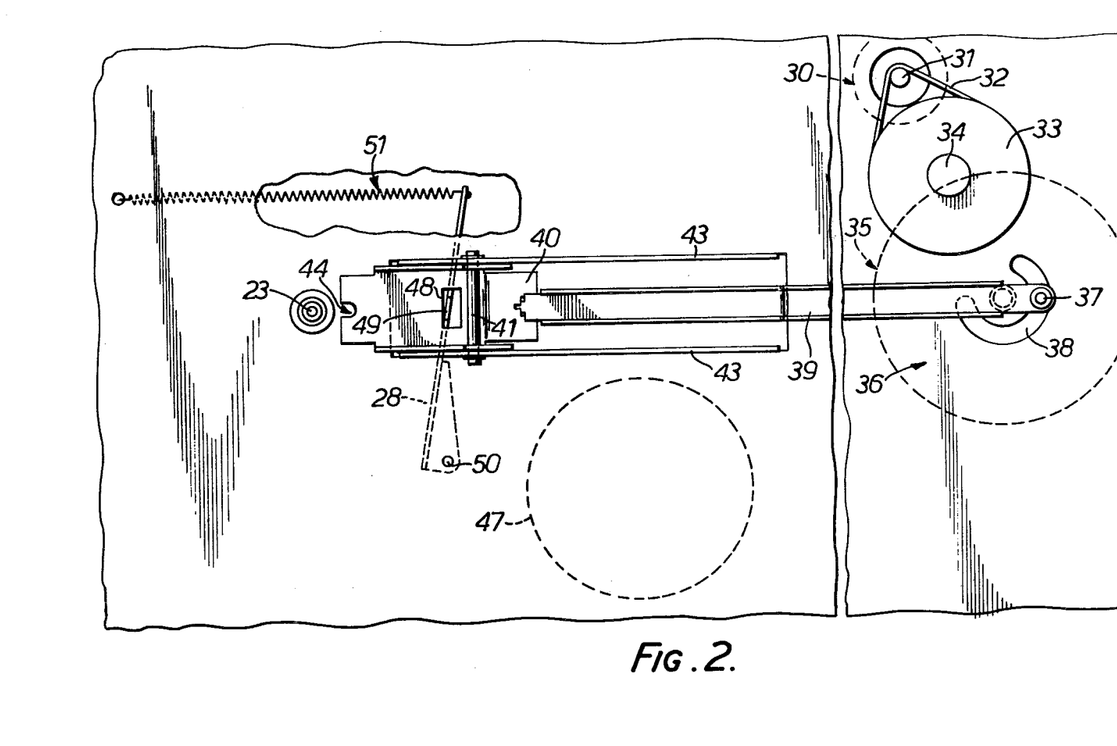
FIG. 2 is an underneath view of the equipment of FIG. 1.

The condition of the mechanism 24 as shown in FIGS. 1 and 2 is its initial condition in which fingers 18 project to support a stack of records and the brake lever 28 is spaced from wheel 9 to allow the turntable to rotate without actuating the screw mechanism. Turntable device is provided by the pulley 2, a belt 45, a pulley 46 and a pulse-operated reversible stepping motor 47.

Rotation of the cam from the illustrated position causes arm 39 to move to the left as seen in FIGS. 1 and 2. The initial movement to the left displaces over 40 bodily to the left to allow brake lever 28 to engage wheel 9. The turntable motor 47 can then be put into reverse and be fed a given number of pulses, to cause a given number of revolutions such as will raise platform 15 to just above the lower fingers 18. If the turntable is then driven forwardly by an appropriate number of pulses, the platform will drop to the turntable, leaving any record or records originally carried by platform 15 supported by fingers 18. Finally the motor 30 can be driven in reverse to restore the condition shown in FIGS. 1 and 2 in which the turntable is free to turn normally.

A second mode of operation is possible to achieve dropping of a record from a stack supported by fingers 18. In this mode a given number of pulses is fed to motor 30 to move arm 39 and lever 40 to the left sufficiently to engage brake lever 28 with wheel 9. The appropriate number of pulses is then fed to motor 47, when in reverse mode, to cause the platform to rise to just below the supported stack. Another given number of pulses is then fed to motor 30 to drive arm 39 further to the left. This causes displacement of slot 44 into engagement with the shaft 23 and pivoting of lever 40 ensues when shaft 41 reaches the ends of slot 42. The number of pulses is such that the shaft 23 is pulled down just far enough to extend fingers 19 to hold all but the bottom record of the stack. These operations of motor 47 and motor 30 can also be effected in the opposite order, ie. to hold the stack before lifting the platform. Subsequently, further pulses are fed to motor 30 to pivot lever 40 sufficiently to withdraw fingers 18 and so allow the bottom record to fall a very small distance onto platform 15.

A given number of pulses is then fed to motor 47 in its forward direction so as to lower the record onto the turntable. Finally the motor 30 is operated in the opposite direction to disengage the shaft 23 and disengage the brake to allow for turntable rotation in a record playing mode. Associated with the described mechanism is a motor control circuit diagrammatically illustrated in FIG. 3.

Figure 3:
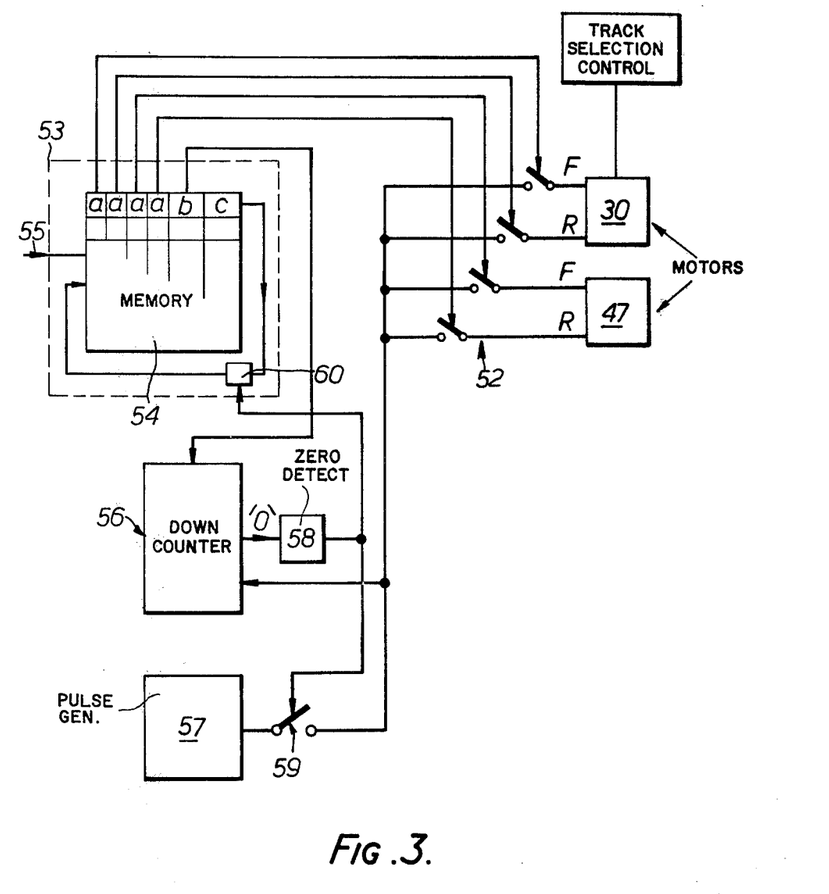
FIG. 3 is a block circuit diagram of a control circuit.

FIG. 3 shows the motors 30 and 47 both of which can be set in forward and reverse mode by switches 52 controlled by a memory circuit 53 containing a memory 54. Memory circuit 53 has an addressing input 55 by which an order signal can be supplied to the memory 54 defining the operation required, e.g. raise a record(s), drop a record, etc. At the memory addresses defined by the order signals are words defining (a) which of switches 52 is to be operated, (b) a number giving the number of pulses to be supplied to one of the motors and (c) an address for another word in memory 54 which contains the data for the subsequent step, if any, of the operation. The data defining a number of pulses presets a down counter 56 which is counted down by pulses from a pulse generator 57. A logic circuit 58 detects when the counter has reached zero, i.e. when the preset number of pulses has been supplied, whereupon circuit 58 opens a switch 59 to stop further pulses and enables a store 60 which stores the next address as defined by the selected word. On being enabled, store 60 passes its address to the memory 54 to select the next word required.

By way of example, for dropping a record the memory 54 includes words defining the following steps, starting at word W1:

W1=30 reverse, N1 pulses, next address W2, (where N1=sufficient pulses to actuate brake lever and pull out upper fingers);

W2=47 reverse, N2 pulses, next address W3, (where N2=sufficient pulses to lift platform 15 to just below tips of lower fingers);

W3=30 reverse, N3 pulses, next address W4, (where N3=sufficient pulses to withdraw lower-fingers);

W4=47 forward, N4 pulses, next address W5, (where N4=sufficient pulses to fully lower platform);

W5=30 forward, N5 pulses, next address NONE, (where N5=sufficient pulses to fully withdraw arm 39).

Additional data can be stored in the words to provide for further controls, e.g. as described in British Application No. 13084/75, U.S. application Ser. No. 670,421, incorporated herein by reference, where the motors are additionally controlled for track selection and record selection.

As also indicated in FIG. 1, the motor 30 and cam 36 are utilized in addition to control a tone arm 61. For this purpose the cam has a projection 62, having a ramp, on which can ride a rod 63 mounted for vertical sliding motion. The upper end of the rod 63 engages the tone arm. Rotation of the cam 36 under control of the motor 30 and counter 56 causes the rod 63 to rise thereby to lift the tone arm in preparation for its movement across the turntable.

Figure 4:
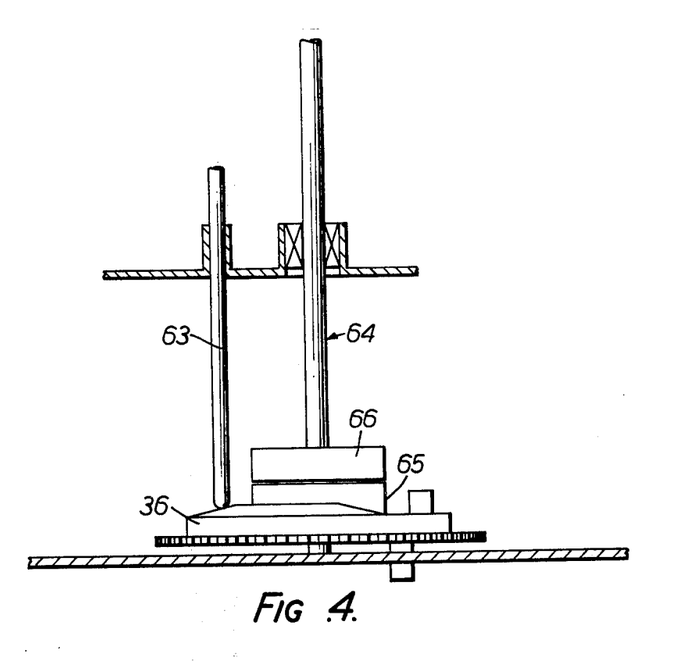
FIG. 4 shows a view of a tone arm control arrangement.

FIG. 4 is a side view of the cam 36 and rod 63 and also shows a rotatably mounted shaft 64 carrying the tone arm. The upper surface of cam 36 carries a solenoid 65 of a magnetic clutch, a magnetic plate of which is indicated at 66 attached to the lower end of shaft 64. When the solenoid is energised, rotation of motor 30, and thus of cam 36, transmits rotaty motion to the tone arm. All the necessary motions of the tone arm are there achieved by operation of motor 30 and solenoid 65, both of which can be controlled from the memory as disclosed in British Patent Application No. 13084/75 (U.S. application Ser. No. 670,421). Thus, not only can the present invention be used as a record changer per se but it can also be used in a record track selection system according to the aforementioned applications. By the use of the record changing facility it is possible also to achieve record and track selection, e.g. to play tracks in a random sequence, such as; Record 1 track 2; Record 3 track 6; Record 2 track 3 and so on.

A second embodiment of the invention (FIGS. 5 and 6) differs from that described above in using the turntable motor to actuate the means for operating shaft 23. In this case the serrated wheel 9 is replaced by a gear 9.

The base plate 21 rotatably supports a second gear 67 having a toothed circumferential surface 6 and a circumferential flange. The flange is notched at 68 (FIG. 6) to be engaged by spring loaded pawl 69 when the turntable is put into reverse (driving the second gear 67 via the gear 9). The gear 67 has a gap 70 where a section of its teeth have been omitted; a pivoted member 71 pivoted to the second gear carries teeth 72 which take the place of the omitted section when the pivoted member is pivoted. A projection 73 (FIG. 5) of the pivoted member 71 passes through the second gear 67 with considerable clearance; when the second gear 67 is oriented so that the gear 9 is in the gap 70, the projection is positioned in the path of movement of an arm 39 (corresponding to arm 39 of FIG. 1) which can thus be actuated to hit the projection to engage the teeth of the pivoted member with the gear 9.

The second gear 67 supports a cam 74 engaged by a follower 75 carried by a plate 76 guided for sliding motion by a shaft of the second gear passing through a slot 77 in the plate 76. One end of the plate is pivotally mounted to an angled arm 40 (corresponding to arm 40 of FIG. 1) spring biased towards the plate to engage a forked end of the arm with a slot near the end of shaft 23. The arm is also loosely guided by the base plate at 41.

Figure 5:
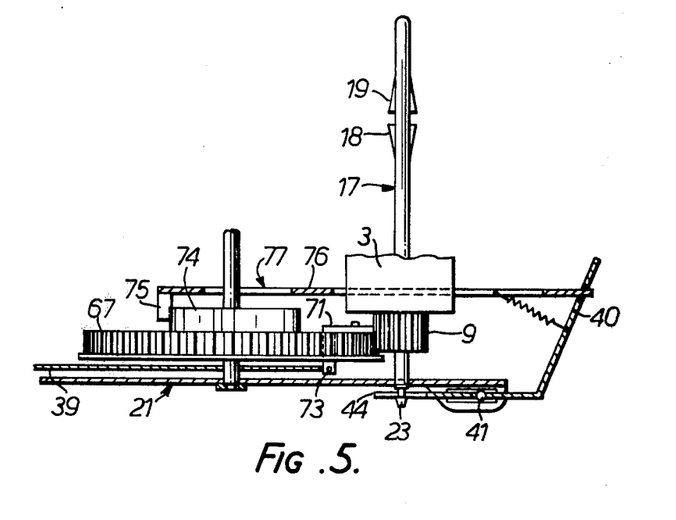
FIGS. 5 to 7 show further embodiments of the equipment.
Figure 6:
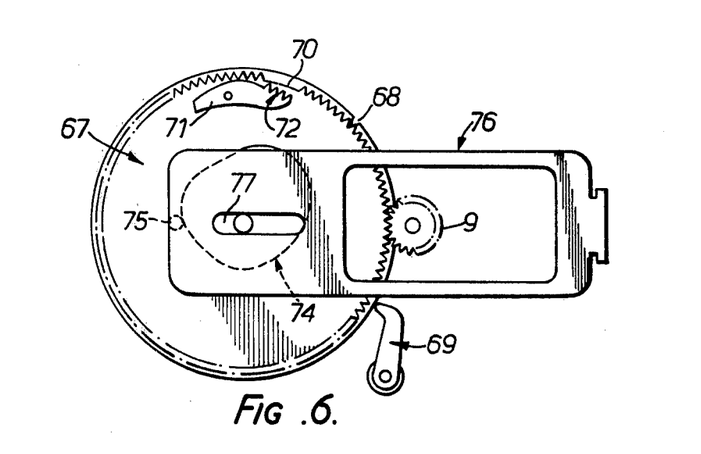

The mechanism operates as follows.

During record playing, the turntable rotates carrying with it the gear 9 which rotates freely as it is then aligned with the gap in the second gear. When record changing is required, arm 39 is displaced to pivot the teeth of the pivoted member into engagement with the gear 9. The further rotation of the gear 9 thus rotates the second gear and after a fraction of one revolution of the second gear, the two gears are full interengaged.

The rotation of the second gear 67 causes cam 74 displace the follower 75 and the plate 76 to the left to engage end 44 of arm 40 with the shaft 23. Further rotation drives spindle 41 to the end of the slot in which it is mounted. The consequent pivoting of arm 40 pulls the shaft 23 downwards firstly to displace fingers 19 outwardly and thereafter to pull fingers 18 in to release a record. Near the end of one revolution, gear 9 hits a protuberance on member 67, thereby displacing it from its operative position and ensuring that the gears disengage when gear 9 again reaches the gap 20.

When a record or stack of records is to be lifted, arm 39 is actuated to engage gears 67 and 9 and the turntable is turned forwardly until notch 68 passes pawl 69. The turntable is then reversed and, after a small angular displacement of gear 67 in reverse, pawl 69 engages notch 68 to lock gear 9. Consequently the platform 15 (FIG. 1) is lifted by the continued reverse rotation of the turntable. After a measured amount of displacement of the turntable in reverse and sufficient to locate the record or records above fingers 18, the turntable is turned in its normal direction to lower platform 15. Continued rotation reactivates the centre spindle mechanism, the first record is dropped onto the turntable and the gear 67 returns to its initial orientation permitting uninterrupted record playing until further actuation of arm 39 calls for a second record.

Figure 7:
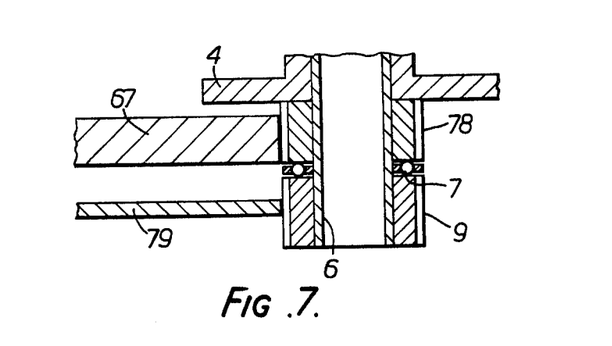

FIG. 7 shows a third embodiment in which a gear 78 rigidly attached to the plate 4 and thus to the turntable is interposed between gear 9 and the plate 4. Gear 67 engages gear 78 in this embodiment purely to control record release, initiated by arm 39. Gear 9 is now engageable by a further arm 79 the movement of which is controlled by the control circuitry.

In this case the rotation of the turntable and the movements of arms 79 and 39 are controlled so as to enable the screw arrangement to assist in lowering a record by rising to just below the stack as the fingers 18 are pulled inwardly.

In this third embodiment, a flange is not provided on the gear 67 and the associated pawl is also omitted.

This embodiment operates as follows. When it is required to drop a record onto the turntable from a supported stack, initially the arm 79 is actuated to engage gear 9 and so hold it against rotation. The turntable is then driven into reverse to lift the platform 15 to a position just below the lowermost record of the stack. The arm 79 is then removed to allow the gear 9 to rotate freely, the arm 39 is operated to engage the gears 67 and 78 and the turntable is put into forward rotation to cause the record drop mechanism to function to drop the lowermost record onto the platform 15. When this action has been completed and the gear 67 reaches its position in which its gap faces the gear 78, the arm 79 is again operated to engage the gear 9 and the turntable continues to rotate forwardly to lower the platform, and thus the lowermost record, onto the turntable. The arm 79 is then disengaged and continued rotation of the turntable enables normal playing of the record to proceed.

Another embodiment has an appearance similar to that of FIGS. 1 and 2 but employs a simplified centre spindle in which the mechanism for operating the lower fingers 18 is omitted and these fingers are biased radially outwardly by spring force. Moreover the platform 15 is made considerably thicker than is shown in FIG. 1 and is formed with a counterbored aperture the upper portion of which has a relatively large diameter to clear the fingers 18 and 19 and the lower portion of which has a smaller diameter to enable it to engage the fingers 18 to press them inwardly for the release of a record. To achieve a record drop, the arm 39 is actuated to cause the screw arrangement to operate to raise the platform until its upper surface is just below the lowermost record whilst the lower portion of the counterbore will have engaged the fingers 18 to press them inwardly and thus release the lowermost record onto the platform 15. The turntable is then driven forwardly to lower the screw arrangement until the record reaches the turntable.

In these further embodiments, as in FIGS. 1 to 3, a reversible turntable motor is employed and preferably this is in the form of a stepping motor, e.g. a 24-pole motor of the kind having two series connected windings (or a centre-tapped winding). This motor is fed with pulses a count of which is kept in a counter of the control circuitry so that a precise measure can be obtained of turntable position, motor position, and the number of pulses which have been fed to the motor in a given time (i.e. turntable speed). During normal running, the control circuitry will control the supply of pulses to the motor to achieve the desired constant speed. At other times the pulse count in the counter will enable the control circuitry to determine the precise position of the screw arrangement in its lifting and lowering motion, thereby to achieve the operations described above under precisely controlled conditions. It will also be apparent that the count in the counter can be used to give a precise measure of turntable angular position and so enable the tone arm to be lowered at a precise angular position of a record. This is particularly useful in one embodiment disclosed in the above-mentioned Application No. 13084/75 where it is desired to have the tone arm drop onto a record at substantially the same position at which it was detected that a gap between tracks existed. As explained in that Application, this feature enables the system to minimise the effects of eccentricity in a record when making track selections.

We claim:

1. Phonograph record changer equipment comprising:
    (a) first support means;
    (b) a turntable rotatably mounted relative to said first support means;
    (c) a reversible motor for driving said turntable;
    (d) second supporting means for supporting a stack of phonograph records above said turntable and for releasing records one-by-one from the stack onto said turntable;
    (e) a record displacing member mounted coaxially of said turntable for movement in the axial direction thereof and for rotation about the axis of said turntable;
    (f) said record displacing member having a screw-threaded coupling with said turntable and being free normally to rotate together therewith; and
    (g) releasable means for selectively holding said record displacing member against rotation with said turntable so that, by screw-threaded action of said coupling, said record displacing member will rise axially when said reversible motor is operated in the reverse direction to that of record playing and will drop axially when the motor is operated in the record playing direction.

2. Equipment according to claim 1, wherein the turntable comprises a rotatably mounted platform coupled to be driven by said reversible motor and having an aperture at its axis of rotation, and said coupling is provided by an annular portion carried by the platform and having a screw-threaded coupling with the record displacing member which is axially displaceable relative to the platform to project upwardly through said aperture to displace records axially relative to said platform.

3. Equipment according to claim 2, and comprising control means for controlling the releasable means and the motor to provide an operating mode in which the record displacing member lifts a record away from the platform and conveys it to the stack.

4. Equipment according to claim 3, wherein said control means is additionally arranged to control the supporting means to provide another operating mode in which the record displacing member is raised to collect a record from the supported stack and lower the record to a record playing position supported by the turntable.

5. Equipment according to claim 2, wherein there is an intermediate screw-threaded member coupled by screw threads between the record displacing member and the annular portion to provide a telescopic screw-threaded arrangement.

6. Equipment according to claim 5, wherein the supporting means comprises a turntable centre spindle having displaceable record support members, the telescopic screw-threaded arrangement being mounted co-axially about the spindle.

7. Equipment according to claim 1 and comprising control means for controlling said releasable means, said motor and said second supporting means to provide a mode of operation in which the record displacing member is raised to collect a record from the stack and subsequently lowered to move the collected record to a record playing position.

8. Equipment according to claim 1, wherein the motor is a stepping motor and means are provided to supply the motor with pulses.

9. Equipment according to claim 8, and comprising control means, having counter means for keeping a count of pulses supplied to the motor, for controlling the supply of pulses to the motor thereby to control the operating position of the record displacing member.

10. Equipment according to claim 1, and comprising a tone arm and a second motor for controlling the position of said tone arm of the equipment, the releasable holding means being actuable by movement of a member initiated by the tone arm motor.

11. Equipment according to claim 10, wherein the supporting means comprises a centre spindle having displaceable members for releasably supporting a stack of records and an operating shaft, the members being operable by the operating shaft to allow removal of records from the stack, and wherein there are means for operating said shaft coupled to be actuated by the second motor and means for releasably coupling the operating means to the shaft.

12. Equipment according to claim 11, wherein the operating means comprises an actuating arm displaceable by the second motor, the coupling means comprises a pivoted lever pivotable by displacement of the arm to engage and displace the operating shaft, and wherein the releasable holding means is a brake displaceable by the lever to hold stationary the said record displacing member.

13. Equipment according to claim 12, wherein the brake is coupled to the arm so that, during travel of the arm, the brake is applied to said record displacing member prior to displacement of the operating shaft.

14. Equipment according to claim 1, wherein said record displacing member is coupled to rotate with a first gear and the releasable holding means comprises a second gear, a displaceable section of teeth of the second gear and means engageable with the second gear to hold it against rotation, there being means for initiating axial displacement of the record displacing member by displacing the section of teeth into engagement with the first gear.

15. Equipment according to claim 1, and comprising a record track selection system operable to select tracks on any one of a variety of records according to a manual preselection, the system being arranged to control the record displacing member to cause record selection according to the manual preselection.

16. Phonograph record changer equipment comprising:
(a) first support means;
(b) a turntable rotatably mounted relative to said first support means;
(c) second supporting means for supporting a stack of phonograph records above said turntable and for releasing records one-by-one from the stack onto said turntable;
(d) rotary drive means;
(e) a screw arrangement driven by said rotary drive means and having telescopic screw-threaded parts for displacing a record relative to said first support means in the axial direction of said turntable responsive to said rotary drive means to extend and retract one part of the screw arrangement in the axial direction, said one of said telescopic screw-threaded parts arranged for carrying a record; and
(f) control means for enabling said screw arrangement to extend and retract from said turntable.

17. Equipment according to claim 16, wherein the screw arrangement has a first part to which the rotary drive is applied, and a second part which is selectively held against rotation to cause operation of the screw arrangement, the applying means being a reversible turntable motor for driving the turntable and being coupled to said first part to apply the rotary drive thereto, rotation of the motor in its record playing direction causing lowering of the record support portion and rotation in reverse raising the record support portion, and there further being means for selectively holding said second part against rotation.

18. Equipment according to claim 17, and comprising a mechanism operable to actuate the supporting means, the mechanism having a releasable coupling with the turntable motor, the coupling comprising two gears one of which has a section of teeth displaceable for temporarily engaging the two gears.

19. Equipment according to claim 16, wherein said second supporting means comprises a record player centre spindle extending coaxially through said screw arrangement, said centre spindle having displaceable members for releasably retaining a stack of records above said turntable and an operating shaft for the displaceable members, there being associated with the centre spindle means for actuating the operating shaft thereof.

20. Equipment according to claim 16, wherein said screw-threaded parts comprise first and second screw-threaded cylinders, the screw arrangement also comprising an annular portion attached to rotate with said turntable, said second cylinder being coaxially within and threadably engaged with the annular portion, said first cylinder being coaxially within and threadably engaged with the second cylinder, there also being further cylinders, the first and further cylinders being telescopically arranged and coupled for relative sliding motion by keys and keyways substantially for preventing relative rotation between the first and further cylinders, and there further being means for releasably holding one of the further cylinders against rotation so that, when the turntable is driven, the screw arrangement will extend and retract axially, depending upon the direction of rotation, to lift and lower a record.

21. Phonograph record changer equipment comprising:
(a) first support means;
(b) a turntable rotatably mounted relative to said first support means;
(c) second supporting means for supporting a stack of phonograph records above said turntable and for releasing records one-by-one from the stack onto said turntable;
(d) a screw arrangement comprising a first, rotatable, part and a second, axially and rotatably movable, part which can be releasably held against rotation whilst the first part is rotated to drive the second part axially, thereby to displace a record relative to said first support means in the axial direction of the turntable;
(e) releasable means for releasably holding said second part against rotation whilst permitting axial displacement of the second part;
(f) a reversible motor for driving said turntable and coupled to said first part to apply a rotary drive thereto, rotation of said reversible motor in its record playing direction causing lowering of said second part and rotation in the reverse direction causing raising of said second part when said second part is held against rotation;
(g) a tone arm;
(h) a second motor operable to control the position of said tone arm; and
(i) a control member coupled to actuate the releasable means, to hold the second part against rotation, responsive to said second motor.

* * * * *